F. RAY.
PACKING RING.
APPLICATION FILED JULY 14, 1921.

1,424,377.

Patented Aug. 1, 1922.

Inventor
Frederick Ray
By his Attorney
W. F. Bissing

UNITED STATES PATENT OFFICE.

FREDERICK RAY, OF GREENWICH, CONNECTICUT.

PACKING RING.

1,424,377. Specification of Letters Patent. Patented Aug. 1, 1922.

Application filed July 14, 1921. Serial No. 484,586.

*To all whom it may concern:*

Be it known that I, FREDERICK RAY, a citizen of the United States, residing at Greenwich, Connecticut, have invented certain new and useful Improvements in Packing Rings, of which the following is a specification.

My invention relates to packing rings and more particularly to metallic piston rings adapted to be mounted upon the pistons of internal combustion gas engines.

One of the objects of my invention is to provide a piston ring which will give substantially uniform outward radial pressure at all parts of the circumference, not only when new, but after it is somewhat worn, under which conditions the ring must open slightly to compensate for the wear.

In the usual type of piston rings the opening of the ring causes a change in the distribution of the pressure exerted by the ring, which is undesirable, as it results in uneven wear and leakage of the oil or gas past the piston ring.

In my improved compound, compensating ring, these difficulties are overcome, since, as the ring wears and consequently opens out, the distribution of pressure about the circumference of the ring remains uniform and substantially the same as before wear, the intensity of this pressure decreasing somewhat as the wear increases. This latter fact is not objectionable since the decrease is slight and it is possible to make the initial pressure such that a sufficient pressure remains to prevent undue leakage after the maximum amount of wear provided for has taken place.

With the above and other objects in view, my invention consists in the parts, improvements and combinations more fully pointed out hereinafter.

Referring now to the drawings.

Figure 4:
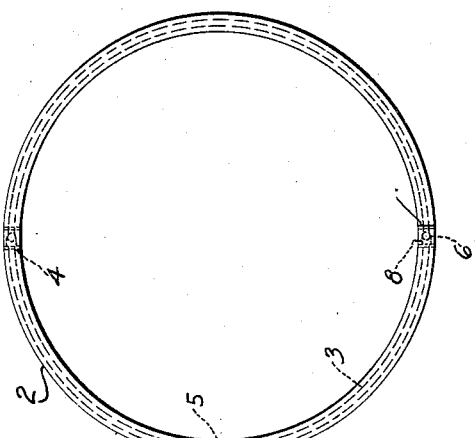
Fig. 4 is a top plan view of the assembled rings and band of Figs. 1, 2 and 3, the compound ring being shown closed.
Figure 5:
Fig. 5 is a front elevation of the ring shown in Fig. 4.
Figure 6:
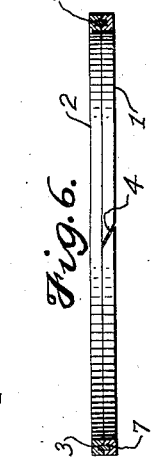
Fig. 6 is a cross section of the ring shown in Fig. 4.
Figure 3:
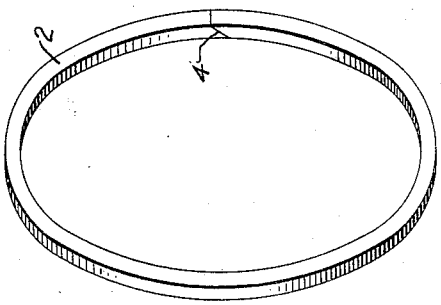
Fig. 3 is a perspective view of the other hammered or treated ring, shown closed.
Figure 7:
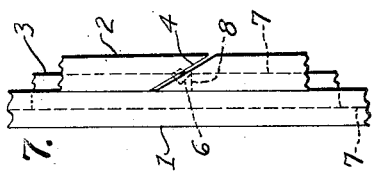
Fig. 7 is an enlarged end elevation of a portion of the two rings shown in Fig. 4, showing the registering device.
Figure 8:
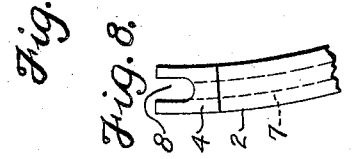
Fig. 8 is a side view of one end of the ring shown in Fig. 7.
Figure 2:
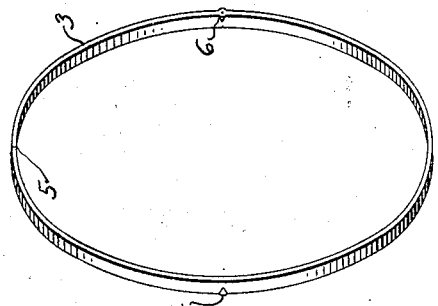
Fig. 2 is a perspective view of the stress transmitting band.

In the construction shown, the compound ring consists of two rings, 1 and 2, both, in the best embodiment of the invention, having the same uniform rectangular cross section and joined together by a third thin stress transmitting band 3, the rings 1 and 2 being split at one point 4 in their circumference in the usual manner. The band 3 is also split either at one point 5 or at two opposite points. The splits or cuts of the rings 1 and 2 are diametrically opposite while the cuts in the ring 3 are displaced with reference to the cuts in the rings 1 and 2, and are preferably at right angles to those in 1 and 2. The three rings are held in these relative positions by small dents 6 in the band 3 which project slightly into the cuts in the rings 1 and 2.

I prefer to make my pressure or wearing rings of cast iron and usually construct these rings by first making a casting in the form of a hollow cylinder of the proper size and thickness, which is then machined inside and out and the rings cut off. These rings which are now in a rough finished state with all their dimensions slightly oversize, are then slit or cut with a thin saw, the cut preferably being at an angle with the face of the ring, the angle of 30 degrees being a suitable one. The cut rings are then preferably knurled by means of a machine such as shown and described in my Patent No. 1,304,371, or they may be hammered by a hammering machine in which uniformly spaced blows of varying intensity are used, or wherein unevenly spaced blows of uniform intensity are used. Either of these methods is capable of producing commercially satisfactory rings, but I prefer the first method. Each ring is then held in a suitable chuck in a lathe and the groove 7 turned in its face to receive the stress transmitting band. A small hole is then drilled through one end of the ring to the bottom of the groove of the other end, which end is then milled out, to make a registering notch 8, after which the two faces of the ring are ground on a surface grinder to the exact width. Each of the complementary rings is now finished and the rings are ready to be connected together in pairs by means of the stress transmitting band. The auxiliary or connecting band is preferably made of steel for the purpose of strength, but any suitable metal could be used. The band may be cut from a piece of tubing of correct diameter and thickness and slit or it may be bent up from a flat strip.

If desired it can be made integral with one of the complementary rings and fit in a groove in the other. In any case the auxiliary ring must make a close sliding fit in the grooves so that adjacent portions of the complementary rings can slip slightly circumferentially relatively to each other without undue friction and at the same time so that adjacent portions cannot move radially relatively to each other, to any substantial extent.

In order to maintain the two complementary rings in exact registering relation, that is, with the cuts diametrically opposite, the auxiliary or stress transmitting ring is indented slightly at two points 6 diametrically opposite and 90 degrees from the cut of the connecting band, one of these indentations being on one face of the ring and the other on the opposite face. These indentations may be easily made by means of a tool commonly called a prick punch and a hammer, a suitable chuck being preferably used to hold the ring, provided with properly spaced guides to locate the punch at the proper points. These indentations engage the drilled holes in the ends of each of the complementary rings and hold them in exact registration. As the rings wear and the points open there will result a slight looseness in registration, but the effect of this on the action of the ring is so small that for practical purposes it can be neglected. After the complementary rings are assembled by being connected together in proper relation by means of the auxiliary band, they are mounted upon a mandrel either singly or more usually in considerable number and clamped upon the mandrel by means of suitable end washers and nuts bearing upon the two outer faces of the set of rings. The mandrel is then mounted in a grinder and the outer circumferences of the rings are then ground to the exact size of the cylinder in which they are to be used.

Various other minor operations may be made use of such as gauging for exactness of machining, burring, to remove burrs formed by various machining steps, dipping in rust prevention compound, etc., but as these steps are well known it is not necessary to describe them in detail. Furthermore, various steps described above may be omitted altogether such as the grinding, if a cheaper product is desired, and different methods may be used throughout and still come within the scope of my invention, which is not limited to any particular machine processes.

As already set forth, it is preferably to slit each complementary ring at an angle so that the slit will not have a tendency to wear a ridge in the cylinder and also so as to have the points bear more nearly continuously upon the connecting band. Any well known type of cut may be used but a plain cut in each complementary ring is sufficient as there can be no leakage through the cut, since it is completely sealed by the continuous back of the other ring.

If steel is used for the stress transmitting band and cast iron for the complementary rings, the band is slightly stiffer than a similar cast iron ring would be but this does not affect the underlying law governing the stress and bending moments except as to slight difference in mere magnitude of some of the quantities involved.

As above stated, each of the component rings 1 and 2 may be hammered in a piston ring hammering machine, see for example my Patent No. 1,341,671, or knurled in the knurling machine described in my Patent No. 1,304,371.

Figure 9:
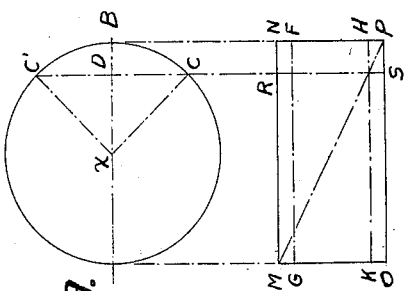
Fig. 9 is a diagram illustrating the law of operation of the ring.
Figure 1:
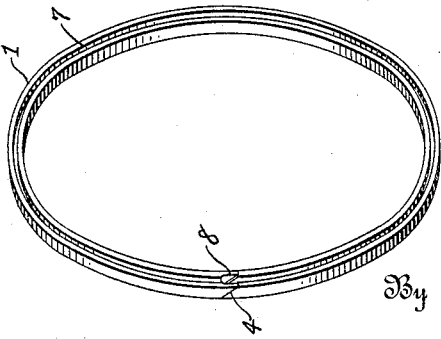
Fig. 1 is a perspective view of one of the rings when hammered, treated or constructed so as to exert substantially uniform radial outward pressure, the ring being illustrated in its compressed condition.

In order that my compound ring may give uniform outward radial pressure at all points of its circumference, the sum of the stress moments set up in the inner circumferences of the complementary rings, comprising the compound rings, as by means of the hammer blows or knurl or condensing tool, should be substantially constant at all points of the circumference. The excess of stress moments in any portion of the ring over that required for uniformity of pressure for the ring is transmitted through the connecting band to the adjacent portion of the other ring where the pressure is, so to speak, deficient. This stress distribution about the circumference of the ring can be illustrated by means of a diagram, Fig. 9, wherein the intensity of a stress at any point of the circumference is represented by a line perpendicular to the corresponding point on the diameter. ABC, in Fig. 9, represents the compound ring, with its center at X, the cut in one complementary ring being at A and the other at B. Consider points C and C' which are symmetrically located with reference to the cuts of both rings. The point D on the diameter AB corresponds to both of these points. The line MN is equal and parallel to the diameter AB, the point R corresponding to the point D, and the line RS representing the magnitude of the stress moments at either of the points C or C'. A similar construction can be carried out for every point of the circumference and for a uniform stress moment all lines such as RS will end in the line OP, thus giving a rectangle for the stress diagram, MNPO, which thus represents the sum of the stress moments at every section, existing in the parts of the compound ring.

Due to the transfer of excess of stress moment from one complementary ring to another which is one of the essential and novel features of my invention, it can be shown that this distribution of stress moments in my compound ring, gives uniform radial pressure. It is immaterial as to what distribution of stress moment is contained in each of the individual rings composing my compound ring as long as the sum of these moments is constant, which results in the rectangular stress diagram. In the compound ring of the preferred construction wherein two complementary rings are used, a simple method of proportioning the stress moment between them is shown on the diagram by the dotted line MP. The stress moments are represented for one complementary ring by the ordinates of the triangle MNP and for the other by the ordinates of MPO. The stress moments in each vary as $1 - \cos a$. This is the condition for uniform pressure in each of the individual complementary rings, as will be seen by examining the law of hammering such a ring (see my U. S. Patent No. 1,341,671). The law of hammering each ring in order to produce a ring giving uniform pressure, is that the intensity of the hammer blow or pressure varies as $1 - \cos a$ plus a constant, as set forth in the patent referred to.

Now coming to the wear of the ring, when the ring opens out or enlarges its diameter due to the wear of the ring or cylinder or both, the radius of curvature at every section of the ring increases an equal amount, assuming the wear to be uniform. It can be shown that there is then set up in every section of the rings a uniform bending stress moment which is proportional to the amount of the increase in the radius of curvature. In the diagram this is represented by the rectangle MNFG in the case of one of the complementary rings, and by the rectangle KHPO for the other. As this bending stress moment is of opposite sense to the hammer stress moment, it reduces the radial pressure caused by the stress moments set up by the condensation of the metal on the inner circumference of the ring. The original rectangular diagram is thus reduced by the area of these two rectangles, leaving the rectangle GFHK as representing the sum of the effective stress moments in the compound ring. Since the diagram is still rectangular the ring exerts uniform radial pressure but of a lesser amount. It is thus readily seen that as the ring opens out the outward radial pressure remains uniform at all parts of the circumference and gradually decreases to zero when the ring is free to open to its full extent.

It is at once seen from the diagram that after the ring opens out the effective stress moment for each individual ring no longer varies as $1 - \cos a$ and hence each ring no longer exerts uniform pressure if by itself, although due to the peculiar coaction between the two of them, when so combined in my compound ring they do exert uniform pressure under all conditions.

Instead of having the distribution of stress moments of the rings follow the law represented by the diagonal MP, any other line extending from top to bottom of the rectangle, dividing it into two symmetrical parts, could be used to indicate the law of hammering or knurling to be followed for each ring. For simplicity of manufacture it is desirable to have all the complementary rings the same, and that each ring be condensed in accordance with the law set forth in my Patent No. 1,341,671.

It will be observed that whereas my compound ring gives uniform radial pressure under all conditions of expansion under wear, the component rings, if used separately, would not. Constructing each complementary ring in accordance with the above law has the practical advantage that each complementary ring may be gaged by itself by means of either of my gaging devices shown in my United States Patents Nos. 1,332,570 or 1,332,571, and the correctness of the distortion of the metal of the inner circumference determined as the individual rings are hammered or knurled, without the necessity of assembling to form the compound ring.

After assembling into the compound ring, it can also be gaged by means of the same gaging devices.

It will also be noted that the effect of opening out of my compound ring, which of course results in opening-out of each of the complementary rings an equal amount, is that at every section the deficiency in stress moment in the one ring is exactly compensated by the excess in the complementary ring, and that the sum of the effective stress moments of the two complementary rings is constant. That is true without regard to the amount that the rings open out until the point is reached when the effective stress moment becomes zero at every point and the rings are open as far as they will go freely.

It is to be understood that although generally desirable it is not necessary to have uniformity of pressure for the satisfactory operation of a piston ring, it simply being necessary that the pressure at every point does not fall below a certain amount. My invention is not therefore limited to rings giving substantially uniform pressure and the corresponding stress moment distribution, as under some conditions a different pressure distribution might be desirable with a different stress moment distribution.

Various ways may be utilized to carry my invention into effect, and various changes made without departing from the principles of the invention. The two complementary rings may be arranged one inside the other and connected by a channel ring. Moreover, instead of making the complementary rings of uniform cross section, they may be made of varying cross section and be suitably hammered or condensed and connected by a connecting band, for which construction a separate patent application will be filed.

Again, the complementary rings may either be cast or made of uniform cross section, but of special circumferential contour, without hammering, the contour being such when each ring is free to assume its normal shape, that it will give substantially uniform pressure when compressed in the cylinder. The form of this contour is well known and need not be described here. By combining such complementary rings in the same manner as set forth above for hammered or knurled rings, a ring is obtained exerting uniform pressure both when new and after it is somewhat worn.

What I claim is:

1. A piston ring consisting of two or more split rings each of which exerts uniform outward radial pressure when compressed to their normal diameter, and means extending around the rings to equalize the bending moments in the rings, whereby the rings will exert uniform radial pressure when their diameter becomes greater than normal.

2. In a compound piston ring the combination of two or more split rings, the metal of each of which is distorted along its inner circumference, and an auxiliary split stress transmitting band for said rings, the split of the auxiliary band being located at a point in the circumference of the rings where the stress moments of the rings are equal.

3. A piston ring consisting of two or more split annuluses, the metal of each of which is distorted on their respective circumferences and means for transferring the stress moments from each annulus to the other.

4. A piston ring consisting of two or more split rings each of which when separate and compressed to its normal diameter, exerting substantially uniform outward radial pressure, means extending around the rings connecting said rings together, said means transmitting the excess of stress moments in portions of each ring to the adjacent portions of the other ring, as the rings wear.

5. A piston ring consisting of two or more split rings, a groove in the side of each of said rings and a split band fitting in said groove, connecting said rings, so that the stress moments of one ring are transferred to the other, the metal of the circumference of each of said rings being so distorted and the rings being so positioned with relation to each other that the sum of the stress moments in said rings at every section is the same.

6. A compound piston ring consisting of two or more rings connected together, each of said rings being condensed on its circumference according to a predetermined law, the sum of the stress moments at every section being the same.

7. A piston ring consisting of two or more split annuluses, the metal of the inner circumference being distorted so that each is adapted to exert radial pressure, and connecting means for said annuluses, said means permitting circumferential relative slippage only.

8. A piston ring consisting of two or more split annuluses, the metal of the inner circumference being distorted so that each is adapted to exert radial outward pressure, said rings being arranged with their splits oppositely disposed, stress transmitting means for said annuluses, and means permitting the relative circumferential slippage of the annuluses but preventing relative radial movement.

9. A metal packing ring consisting of two or more split annuluses, the metal of each of which is distorted along its circumference, so as to introduce stress in accordance with a predetermined law, and means connecting said annuluses, the annuluses being so arranged that the stress moment of any section of the whole ring is the algebraic sum of the stress moments of the individual annuluses.

10. A metal packing ring consisting of two split annuluses, the metal of which is distorted along the inner circumference so as to set up stress moments in each of the annuluses varying as $1 - \cos a$, means connecting said annuluses to prevent relative radial movement of the adjacent parts and means aligning the splits of said annuluses diametrically opposite to each other, whereby the ring is caused to exert a uniform outward radial pressure under any degree of expansion within the proper working limits.

11. A compound piston ring comprising a pair of substantially duplicate split cast iron rings, the metal of each of which is condensed according to the same law so that each ring gives substantially the same uniform radial outward pressure, said duplicate rings being arranged with their split portions disposed substantially diametrically opposite and a split, metal hoop connecting said split rings, said hoop transferring the stress and bending moments from one duplicate ring to the other.

12. A compound piston ring comprising a pair of complementary split cast iron rings, the metal of each of which is condensed according to the law that the stress moments set up in each of the complementary rings varies as one minus the cosine of the angle between the point condensed and the split of the ring, so that each ring gives substantially the same uniform radial outward pressure, said complementary rings being arranged with their split portions disposed substantially diametrically opposite and a split, metal band connecting said split rings, said band transferring the stress and bending moments from one complementary ring to the other.

13. A compound piston ring comprising a pair of substantially duplicate split cast iron rings, the metal of each of which is condensed according to the same law so that each ring gives substantially the same uniform radial outward pressure, said duplicate rings being arranged with their split portions disposed substantially diametrically opposite and a split, metal hoop connecting said split rings, said hoop transferring the stress and bending moments from one duplicate ring to the other, said hoop provided with one or more stops to maintain the rings in registering relation.

14. A compound piston ring comprising a pair of substantially duplicate split cast iron rings, the metal of each of which is condensed according to the same law so that each ring gives substantially the same uniform radial outward pressure, said duplicate rings being arranged with their split portions disposed substantially diametrically opposite and a split, metal hoop connecting said split rings, said hoop transferring the stress and bending moments from one duplicate ring to the other, said hoop provided with two diametrically opposite stops, so as to maintain the rings in registering relation.

15. A compound packing ring consisting of two or more rings, connected together, each of said rings being condensed on its inner circumference in accordance with the law that the stress moments set up in each ring varies as one minus the cosine of the angles between the point condensed and the split of the ring, the sum of the stress moments at every section of the compound ring being the same.

In testimony whereof, I have signed my name to this specification.

FREDERICK RAY.